(12) United States Patent
Zhu et al.

(10) Patent No.: US 8,941,644 B2
(45) Date of Patent: Jan. 27, 2015

(54) COMPUTING THREE-DIMENSIONAL IMAGE MODELS IN PARALLEL

(75) Inventors: Wenwu Zhu, Basking Ridge, NJ (US);
Siyuan Tang, Lianyungang (CN);
Roberto R. Molinari, Bellevue, WA (US); Dan Hou, Yibin (CN)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 13/160,419

(22) Filed: Jun. 14, 2011

(65) Prior Publication Data
US 2012/0320032 A1 Dec. 20, 2012

(51) Int. Cl.
*G06T 15/00* (2011.01)
*G06T 1/00* (2006.01)

(52) U.S. Cl.
USPC .......................................... 345/419; 345/418

(58) Field of Classification Search
CPC ......... G06T 1/00; G06T 15/00; G06T 7/0028; G06T 2207/10016; G06T 2207/20016; G06T 3/4053; G06T 7/0034; G06T 7/2073; G06F 1/1626; G06F 1/1686; G06F 2200/1637; G06F 3/0346
See application file for complete search history.

(56) References Cited

U.S. PATENT DOCUMENTS

| 7,042,448 B2 | 5/2006 | Kunimatsu et al. |
| 7,324,687 B2 | 1/2008 | Zitnick, III et al. |
| 2007/0291032 A1 | 12/2007 | Hashima et al. |
| 2009/0240431 A1* | 9/2009 | Chau et al. .................... 701/208 |
| 2010/0169056 A1 | 7/2010 | Hultgren et al. |

OTHER PUBLICATIONS

Sameer Agarwal, Noah Snavely, Ian Simon, Steven M. Seitz and Richard Szeliski, "Building Rome in a Day", 2009 IEEE 12th International Conference on Computer Vision (ICCV), 2009, p. 72-79.*
Sameer Agarwal and Yasutaka Furukawa, Noah Snavely, Brian Curless, Steven M. Seitz and Richard Szeliski, "Reconstructing Rome", Computer (vol. 43, Issue: 6), IEEE Computer Society, Jun. 2010, p. 40-47.*
D W Shattuck, J Rapela, E Asma, A Chatzioannou, J Qi and R M Leahy, "Ynternet2-based 3D PET image reconstruction using a PC cluster", Phys. Med. Biol. 47 (2002), Institute of Physics Publishing, 2002, p. 2785-2795.*
Cui, et al., "Massive spatial data processing model based on cloud computing model", 2010 Third International Joint Conference on Computational Science and Optimization, May 2010, 4 pages.
Okamoto, et al., "Image-Based Network Rendering of Large Meshes for Cloud Computing", International Journal of Computer Vision, Oct. 15, 2010, 11 pages.
"Photography software leverages cloud computing technology" retrieved at <<http://news.thomasnet.com/fullstory/Photography-Software-leverages-cloud-computing-technology-566773#_normalStart>>, Oct. 7, 2009, 3 pages.

(Continued)

*Primary Examiner* — Kee M Tung
*Assistant Examiner* — Sing-Wai Wu
(74) *Attorney, Agent, or Firm* — Dan Choi; Judy Yee; Micky Minhas

(57) ABSTRACT

This document describes techniques for creating three-dimensional models of image collections using a network-accessible (e.g., cloud-based) computation service, rather than a client computing device. In some instances described below, the computation service performs at least a portion of the operations for creating these models in parallel.

18 Claims, 6 Drawing Sheets

(56) References Cited

OTHER PUBLICATIONS

Shi, et al., "Digital Construction for Spatial Documentation of Beijing Old City" 22nd CIPA Symposium, Oct. 11-15, 2009, 5 pages.

"Technology preview from Autodesk labs: construct 3D scenes with 2D photos", retrieived at <<http://www.deskeng.com/virtual_desktop/?p=2297>>, Aug. 13, 2010, 6 pages.

* cited by examiner

COMPUTING THREE-DIMENSIONAL IMAGE MODELS IN PARALLEL

BACKGROUND

Certain client-side software applications analyze digital photographs from a particular scene and generate a three-dimensional reconstruction or model of the scene. A user of such an application is therefore able to generate a model using the client-side software and then upload the model to a website for later viewing by the user or by other users of the website. For instance, a user may capture a series of photographs of the Eiffel Tower in Paris using a camera and may later transfer these photos to a personal computer of the user. Once the photos reside on the personal computer, the user may generate a three-dimensional model of the photos and then upload this three-dimensional model to a specified website. This user or other users may then view this three-dimensional model of the Eiffel Tower via the specified website.

At present, and as described in the example above, client devices compute these three-dimensional models prior to uploading them to the website. However, these techniques may prove problematic in some instances due to the low-computation capability and battery constraints of certain client devices.

SUMMARY

This document describes, in part, techniques for computing three-dimensional models of collections of images via a network-accessible computation service.

For instance, a client computing device may provide a collection of images (e.g., digital photographs) to the computation service via a network, along with a request to create a three-dimensional model of the images. Upon receiving the images and the request, the computation service may create this three-dimensional model and may provide the model to a pre-specified site that is accessible to a user of the client computing device. After the computation service creates the three-dimensional model and provides the model to the site, a user of the client computing device may navigate to the site to view the three-dimensional model of the originally-provided collection of images.

This summary is provided to introduce concepts relating to the creation of three-dimensional models for image collections by a computation service. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
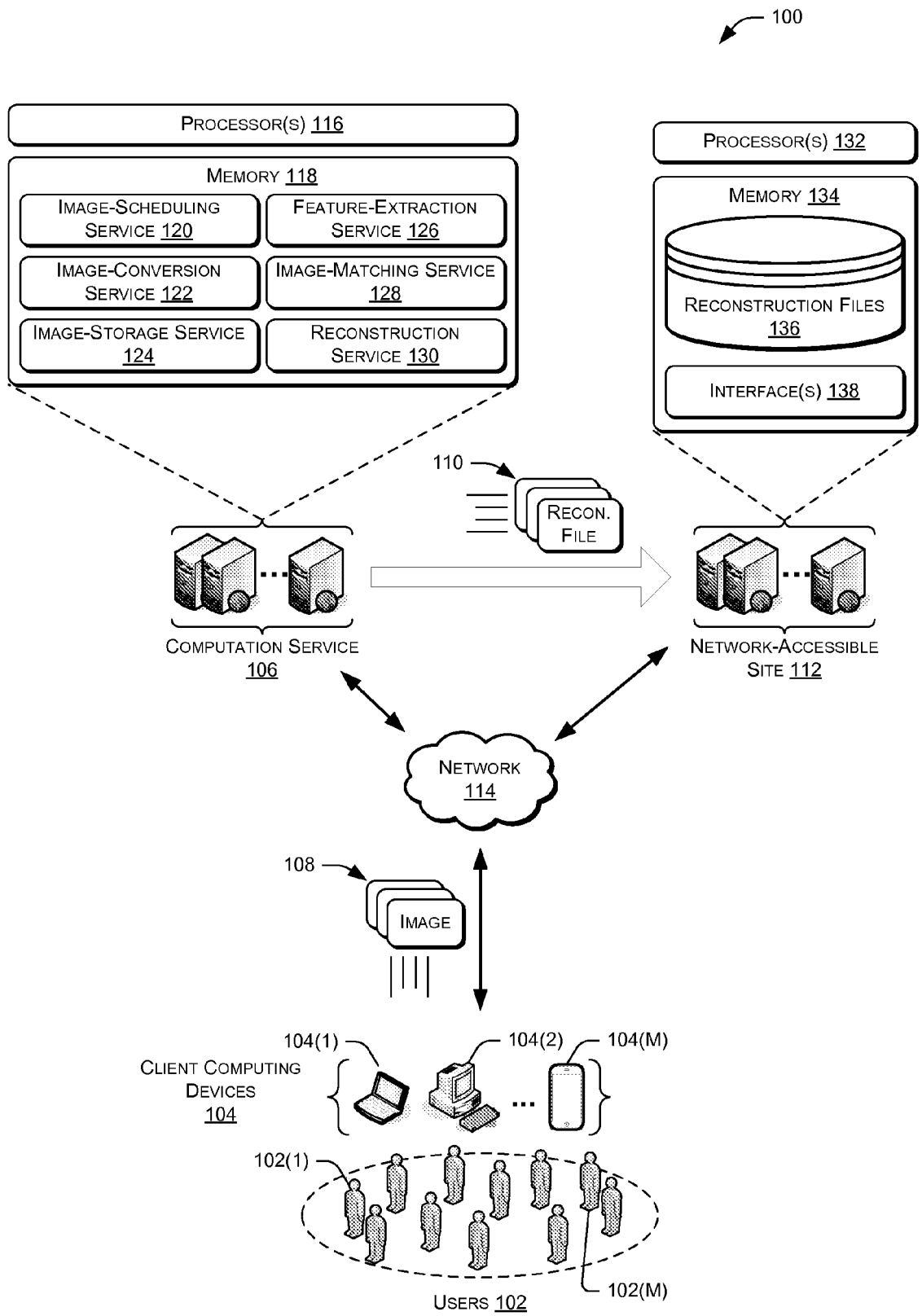
FIG. 1 illustrates an example computing architecture that includes a computation service that receives collections of images from client computing devices and, in response, creates three-dimensional models of the collections. In addition, the computation service may provide these models to a network-accessible site so that users of the client computing devices may later access and view these models.

This document describes, in part, techniques for creating three-dimensional models of image collections using a network-accessible (e.g., cloud-based) computation service, rather than a client computing device. In some instances described below, the computation service performs at least a portion of the operations for creating these models in parallel.

As described above, certain client-side software applications analyze digital photographs from a particular scene and generate a three-dimensional reconstruction or model of the scene. However, the relatively expensive computation of these models currently occurs on the client computing device. After these client devices compute a three-dimensional model, the client then uploads the results to a specified website for later viewing.

When the number of images is small, the client may be able to quickly compute these models. However, if the number of images is large (e.g., 2,000), the client device may spend days or even weeks computing a three-dimensional model of this collection. Furthermore, when the client computing device comprises a mobile device (e.g., a smart phone that captured the images with a camera), the limited computation power and battery life of the client device make computation of the models difficult, if not impossible.

As such, this document describes techniques for creating these three-dimensional models using servers (e.g., in the cloud) rather than a client computing device. For instance, a client computing device may capture or otherwise acquire a collection of related images, such as a collection of digital photographs of a particular scene. The client computing device may then provide, over a network, this collection of images to a computation service, which may comprise one or more servers configured to create a three-dimensional model of the collection.

In one example, the computation service comprises a single server that performs operations for creating the three-dimensional model sequentially. For instance, the server may first convert each of the received images into one or more versions of the respective image having a different resolution than the original image. For instance, these version(s) of an image having a different resolution may comprise lower-resolution versions of the image or a portion of the image. The server may then store these different-resolution versions locally or on a different server.

After converting the images, the computation-service server may then extract features of the images and then compare these features to one another to identify positions of the images relative to one another. That is, the server may use pattern recognition techniques to extract features and identify matching features amongst images of the collection. After identifying the positions of the images relative to one another, the server may then create one or more files representing a three-dimensional model of the image collection. Thereafter, the server may store these created files locally or on another server.

In either instance, the computation-service server may store these files and the different-resolution images on a server that is associated with a site that is accessible to client computing devices. As such, after the computation service creates the three-dimensional model as described above, a user operating a client computing device may access the site and request to render the three-dimensional model of the collection on the client computing device. In response, the site may retrieve both the one or more files representing the three-dimensional model and the different-resolution images, and may serve this data to the client computing device. The client computing device may, in turn, render the three-dimensional model.

By creating the three-dimensional model using the computation service described above, the techniques remove from the client computing device the relatively-burdensome task of computing this model.

In another example, the computation service comprises multiple different servers that perform operations for creating the three-dimensional model, with some of the operations being performed in parallel. For instance, an image scheduler of the computation service may first receive a collection of images from a client computing device and, in response, may define multiple different groups from this collection. The scheduler may then allocate each of these "N" groups to one of N different servers.

In response to receiving one of these N groups, each of the N servers may perform the conversion described above. That is, each server may convert each image to a different-resolution version of the image (e.g., a lower-resolution version of a part of the original image or of the entire original image). Furthermore, these servers may perform these conversions in parallel with one another. Next, each of the N servers may extract features from images of the respective group of images and may compare these features within the respective group. Again, the servers may perform this extraction and this portion of the matching in parallel with one another.

Next, the N servers may compare extracted features of the images across the groups allocated to the different servers. The servers may then provide the results of this matching to a reconstruction server, which may construct a three-dimensional model of the collection of images based at least in part on the received matching results. As with the example above, the creating of this model may comprise creating one or more files indicating the positions of the images of the collection relative to one another. Again, these files may be made accessible to a network-accessible site such that users may thereafter request and render the three-dimensional model on respective client computing devices.

Again, by creating the three-dimensional model using the computation service described above, the techniques remove from the client computing device the relatively-burdensome task of computing this model.

The detailed discussion below begins with a section entitled "Example Computing Architecture", which describes an example architecture for implementing the techniques described herein. A second entitled "Example Computation Service Configurations" follows, and described several example configurations for implementing the computation service of the architecture from FIG. 1. Next a section entitled "Example Processes" follows, before a brief conclusion ends the discussion.

This brief introduction, including section titles and corresponding summaries, is provided for the reader's convenience and is not intended to limit the scope of the claims, nor the proceeding sections.

Example Computing Architecture

FIG. 1 illustrates an example computing architecture 100 that may implement the described techniques for creating three-dimensional models of image collections using a network-accessible computation service, rather than a client computing device.

The architecture 100 illustrates multiple different users 102(1), . . . , 102(M) operating respective client computing devices 104(1), 104(2), . . . , 104(M) to provide respective collections of images to a computation service 106. For instance, a user 102(M) operating the example computing device 104(M) may provide a collection of images 108 to the computation service 106, along with a request that the computation service 106 create a three-dimensional model of the collection 108. For instance, the collection of images 108 may comprise a series of digital photographs of a scene captured by a camera of the computing device 104(M) and uploaded to the computation service 106.

Sometime after providing the collection 108 to the computation service 106, the service 106 may create one or more reconstruction files 110 that collectively represent the three-dimensional reconstruction or model of the scene captured by the collection of images 108. The service 106 may thereafter provide the reconstruction files 110 to servers accessible to a network-accessible site 112. In addition, the computation service may store the image collection 108 or converted versions of the images on the same or different servers accessible by the site 112. While illustrated as a separate service, in some instances the computation service 106 and the network-accessible site 112 may reside on a same set of servers.

After the service creates and provides the reconstruction files 110 to the site 112, the user 102(M) (and/or one or more other users) may access the site 112 to request and render the three-dimensional model of the collection 108 on a client computing device, such as the device 104(M). Specifically, the site may receive the request, access the reconstruction files, and cause the client computing device to render the three-dimensional model of the image collection 108 with use of the reconstruction files 110 and the images stored by the computation service 106. As discussed briefly above and in detail below, these images may comprise different-resolution versions of the images originally-provided to the computation service 106 in the collection 108.

While illustrated as a laptop 104(1), a personal computer 104(2), and a smartphone 104(M), the client computing devices 104 may comprise any other sort of personal computer, mobile telephone, portable music player, or other type of computing device. In each of these instances, the client computing devices 104 may provide the image collections to the computation service 106 over a network 114. The client computing devices may also access the site 112 over the network 114, which is representative of any one or combination of multiple different types of networks, such as the Internet, cable networks, cellular networks, wireless networks, and wired networks. As such, the computation service 106 may, in some instances be referred to as "network-accessible" or "cloud-based", meaning that the users 102 are able to access the service 106 over the example network 114.

As illustrated, the computation service 106 includes one or more processors 116 and memory 118. The memory 118 (and other memories described herein) may comprise computer-readable media. This computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Figure 2:
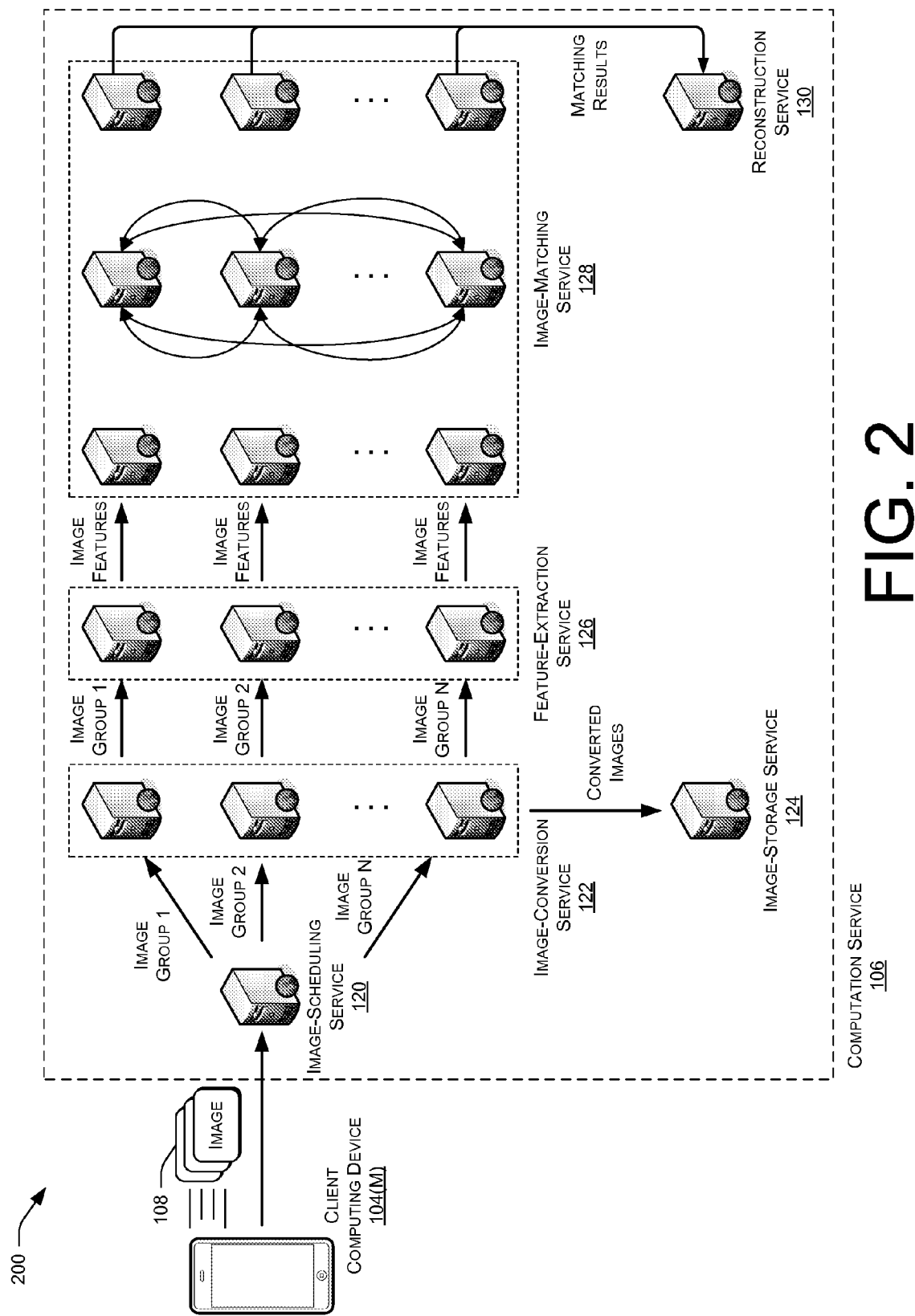
FIG. 2 illustrates one example configuration of the computation service of FIG. 1. As illustrated, the computation service may comprise a series of services, each of which may reside on the same or different servers.
Figure 3:
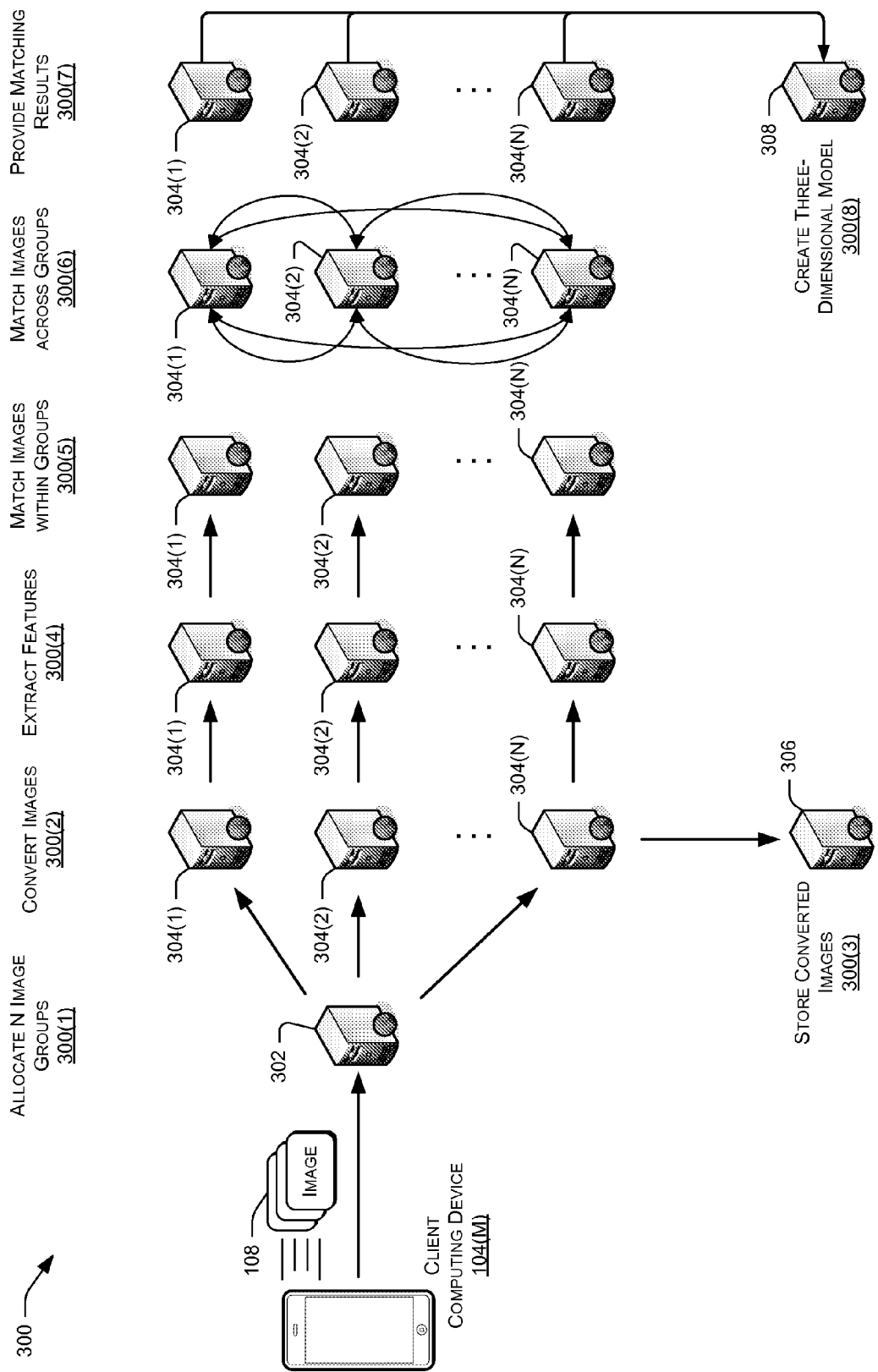
FIG. 3 illustrates an example flow of operations through the example configuration of FIG. 2. Here, some of the services are hosted on a same set of servers.
Figure 4:
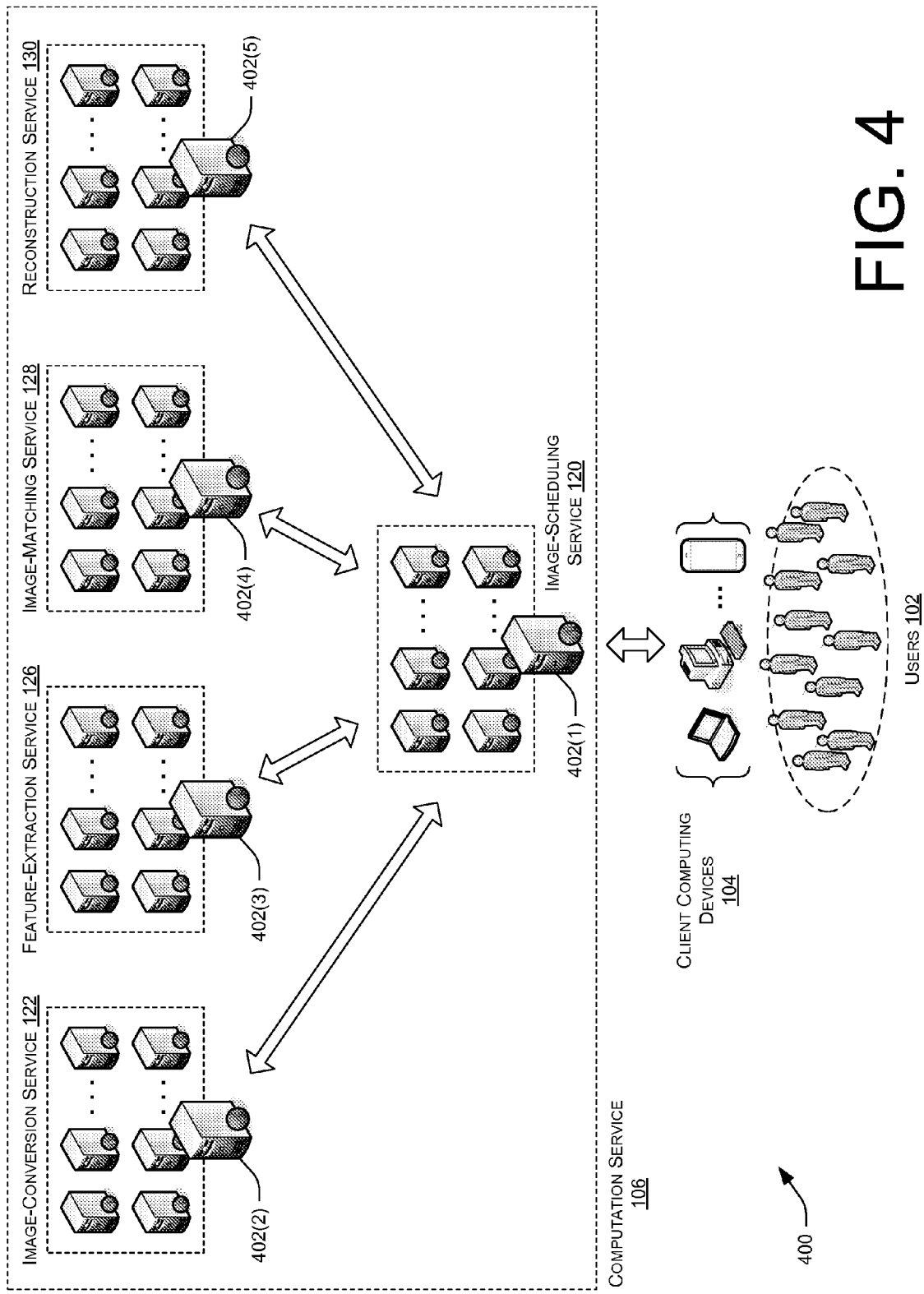
FIG. 4 illustrates another example configuration of the computation service, where some of the different services reside on discrete sets of servers operating behind by respective load balancers.

In the illustrated example, the memory 118 stores an image scheduling service 120, an image-conversion service 122, an image-storage service 124, a features-extraction service 126, an image-matching service 128, and a reconstruction service 130. Each of these services may vary in location and size. For instance, in instances where the computation service 106 comprises a single server, each illustrated service may comprise individual modules stored on and executable by the server. In other instances, meanwhile, each illustrated service may comprise one or more servers. In this regard, FIGS. 2-4 illustrate several example and non-limiting configurations of the computation service 106.

Returning to FIG. 1, the image-scheduling service 120 is configured to receive the collection of images 108, define multiple groups of images from the collection 108, and distribute the multiple groups to respectively different components (e.g., servers) for processing the image groups in parallel. For instance, if the image collection 108 comprises a set of 100 images, the image-scheduling service 120 may define ten groups of ten images, and may allocate each of these groups to a particular server for processing the images in parallel.

The image-conversion service 122, meanwhile, is configured to convert each image of the collection of images 108 to a different-resolution version of the respective image. In one specific example, the image-conversion 122 converts the images into lower-resolution versions of the images using the Seadragon® software by Microsoft® Corporation. Furthermore, in some instances, the image-conversion service 122 may perform the converting of images in parallel. In the example above, for instance, each of the ten servers may convert their respective set of ten images at least partly in parallel with each other server.

The image-storage service 124 may thereafter store the converted images in a storage server(s) of the computation service for later rendering of the three-dimensional model of the collection 108. This server(s) may be located at the computation service, the site 112, or at another location. In each instance, the converted images are stored in a location that is accessible to the site 112, such that the site may thereafter retrieve the images for rendering a three-dimensional model of the image collection on a requesting client computing device.

The feature-extraction service 126 functions to extract one or more features out of the images from the respective image groups. That is, the service 126 may identify unique features of the images using pattern recognition components that may be later used to identify positions of the images relative to one another. In some instances, servers or other components of the feature-extraction service 126 may perform the feature extraction in parallel. In the example from above, for instance, each of the ten servers may extract features from the ten images allocated to that respective server in parallel with the feature extraction performed by the other nine servers.

After the service 126 extracts these features, the image-matching service 128 compares the extracted features to identify positions of the images of the multiple groups relative to one another. For instance, the image-matching service 128 may create a point cloud based on the extracted features, with the point cloud indicating positions of the images in the scene relative to one another.

As with the services above, the image-matching service 128 may perform at least a portion of these operations in parallel. For instance, the service 128 may initially perform image matching within the respective groups by comparing features of the images in the groups. For instance, in the example above, each of the ten servers may compare the features of the ten images within the respective group allocated to the server in parallel with the other nine servers. Thereafter, the service 128 may match features across groups by comparing features from images associated with different groups. A discussion with regards to FIG. 3 below describes one example of performing this matching in greater detail.

After performing in-group and across-group matching, the image-matching service 128 may provide results of the matching to the reconstruction service 130. The reconstruction service 130 then creates a three-dimensional model of the image collection 108 based at least in part on the identified positions of the images of the multiple groups relative to one another from the matching results. The service 130 may create this model in the form of the one or more reconstruction files 110, which may take the form of JavaScript Object Notation (JSON) files or files of any other suitable format.

Upon creating the reconstruction files 110, the reconstruction service 130 may store the files 110 on servers accessible by the network-accessible site 112. As illustrated, servers hosting the site 112 may comprise one or more processors 132 and memory 134. The memory 134 may include a database that stores respective sets of reconstructions files 136, each of which defines a three-dimensional model of an image collection. In addition, the site includes one or more interfaces 138 that allow the users 102 to access the site 112 via the client computing devices 104.

For instance, the user 102(M) that initially provided the image collection 108 may access the site 112 via the interface 138 for the purpose of requesting to view the three-dimensional model of the collection 108. In response, the site 112 may retrieve the reconstruction files 110 and the different-resolution versions of the images for rendering the three-dimensional model of the collection 108. With use of the architecture 100 described above, the user 102(M) is able to view this three-dimensional model on the client computing device 104(M) without the device 104(M) performing the computationally-intense process of creating the three-dimensional model.

Example Computation Service Configurations

FIG. 2 illustrates an example configuration 200 of the computation service 106 of FIG. 1. As illustrated, the computation service 106 may comprise the series of services described above with reference to FIG. 1, each of which may comprise the same or different servers.

In this example, the client computing device 104(1) may upload the collection of images 108 to the image-scheduling service 120 (or "image scheduler"), which may allocate the images into images groups one through "N." In addition, the image scheduler may provide the N image groups to N different servers of the image-conversion service 122. In some instances, the image-scheduler may comprise one of the N servers, while in other instances it may not. The image-conversion service 122 may then convert the images within the groups to different-resolution versions of the images as described above, and may provide these converted images for storage on the image-storage service 124.

Next, the feature-extraction service may extract features from the within the images of the N image groups and provide these features to the image-matching service 128. The image-matching service 128 may then compare features of the images within the groups as well as features of images across the groups, and may provide the results of the matching to the reconstruction service 130. The reconstruction service 130 may then create the three-dimensional model of the image collection 108 in the form of the reconstruction files 110 described above.

FIG. 3 illustrates an example flow of operations 300 through the example configuration 200 of FIG. 2. In this illustrative and non-limiting example, some of the services described above are hosted on a same set of servers.

As illustrated, in this example the client computing device 104(M) uploads the image collection 108 to a single image-scheduler server 302. While the image scheduler comprises a single server in this example, the image scheduler may comprise multiple servers in other instances. After receiving the image collection 108, at 300(1) the image-schedule server 302 allocates N image groups to N different servers 304(1), 304(2), ..., 304(N).

At 300(2), each of the servers 304(1)-(N) converts images of the respective group allocated to the server to different-resolution versions of the images, at least partly in parallel with each other server. In addition, each of the N servers may provide the different-resolution versions to a storage server 306. At 300(3), the storage server 306 may store the different-resolution versions of the images.

At 300(4), each of the servers 304(1)-(N) extracts features from images of the respective image group allocated to the server, at least partly in parallel with each other server. As described above, these features may be used to identify relationships between images of the image groups during the matching phase of the operations.

Next, the servers 304(1)-(N) attempt to identify these relationships between the images of the collection 108 with use of the extracted features. In some instances, each possible image pair is compared at this phase. Therefore, if the image collection 108 includes a number of images "M", then the number of image pairs that all of the servers 304(1)-(N) is to compute is equal to $M*(M-1)/2$. Individually, each of the servers 304(1)-(N) may compute a number of image pairs equal to $M*(M-1)/2/N$, in some instances. Furthermore, this matching may include matching images within groups, as well as matching images across groups.

For instance, at 300(5), each of the servers 304(1)-(N) may attempt to perform image matching within the respective image groups 1-N. That is, within a particular server, the server may compare each of the "M/N" images with each other image of the group. It therefore follows that the number of image pairs for matching for one server, in some instances, is $M/N*(M/N-1)/2$.

Next, at 300(6), the servers 304(1)-(N) perform matching of images across the N image groups. Before computing image pairs between or across groups, the servers 304(1)-(N) may exchange data between groups according to group pairs that each server computes. For instance, in the example of N image groups, the number of group pairs may be equal to $N*(N-1)/2$. To distribute these $N*(N-1)/2$ tasks of matching between groups to N servers, each server will attempt to match images with a number of other groups equal to $(N-1)/2$ (where N is an odd number).

Furthermore, when the number of images in the image collection is equal to M, each server will compute a number of image pairs across groups equal to $(M/N)*(M/N)*(N-1)/2$. In order to ensure proper coverage of the matching, each of the servers 304(1)-(N) may use equation (1) to determine which group pairs that the particular server will perform matching on. As shown above, a particular server "i" of the N servers will determine these group pairs as follows:

$$(i, (i+j) \% \text{ServerNumber}) \; j=1, \ldots, (N-1)/2, \text{ where } N \text{ is odd number} \quad (1)$$

To illustrate, envision that N is equal to five within the illustrated architecture of FIG. 3. Here, "j" is therefore equal to 1 and 2 according to the equation above. Therefore, according to equation (1), server 1 will obtain images for matching from servers 2 and 3, server 2 will obtain images for matching from servers 3 and 4, server 3 will obtain images for matching from servers 4 and 5, server 4 will obtain images for matching from servers 5 and 1, and server 5 will obtain images for matching from servers 1 and 2.

After performing the image matching across the groups, at 300(7) the servers 304(1)-(N) may provide the matching results to a reconstruction server 308. With use of these matching results, the reconstruction server 308 may create the three-dimensional model of the images in the form of the reconstruction files 110 at 300(8). That is, the reconstruction server 308 may reconstruct the scene represented by the image collection 108. The reconstruction server 308 may then make these files accessible to the users 102 via the site 112, such that the client computing devices 104 are able to render the three-dimensional model of the image collection 108 with use of the files 110 and the converted images stored on the storage server 306.

FIG. 4 illustrates another example configuration 400 of the computation service 106. In this configuration 400, one or more of the services described above reside on discrete sets of servers operating behind by respective load balancers 402(1), 402(2), ..., 402(5). Such a configuration 400 may improve the processing throughput and maximize the resources of the computation service 106.

Example Processes

Figure 5:
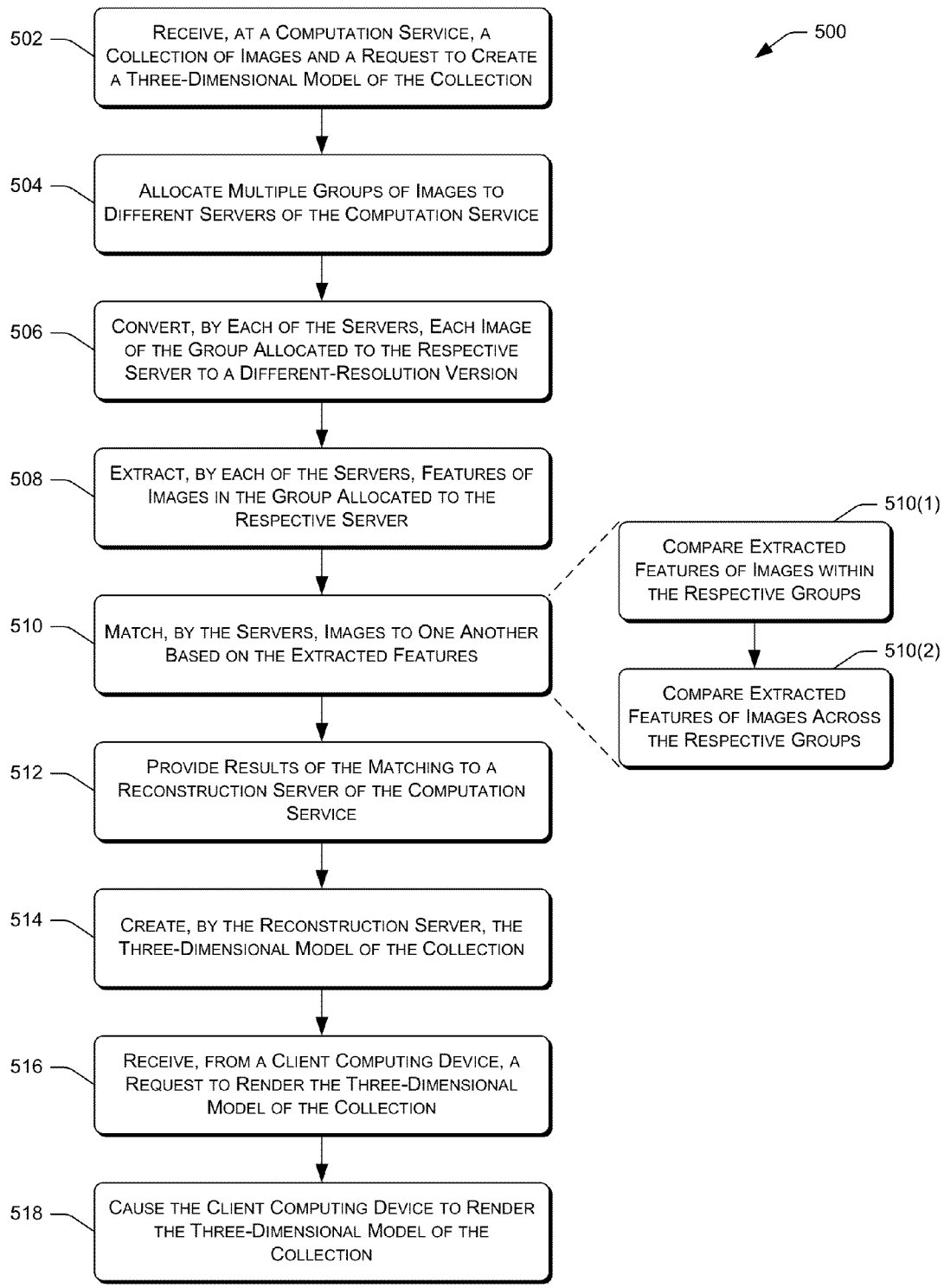
FIG. 5 is a flow diagram illustrating an example process for creating, by a computation service, a three-dimensional model of a collection of images received from a client computing device.
Figure 6:
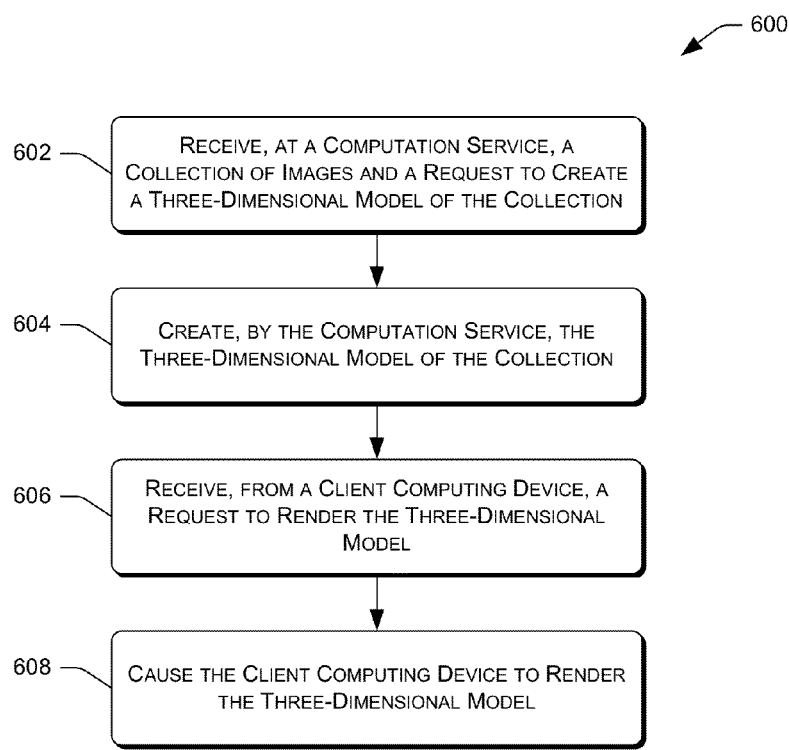
FIG. 6 is a flow diagram illustrating another example process for creating a three-dimensional model of a collection of images by a computation service.

FIGS. 5-6 comprise example flow diagrams of example processes that may be implemented within the architectures described above, or within other architectures. Each of these processes is illustrated as a collection of acts in a logical flow graph, which represents a sequence of operations that can be implemented in hardware, software, or a combination thereof. In the context of software, the blocks represent computer instructions stored on one or more computer-readable media that, when executed by one or more processors, perform the recited operations. Note that the order in which the process is described is not intended to be construed as a limitation, and any number of the described acts can be combined in any order to implement the process, or an alternate process. Additionally, individual blocks may be implemented in parallel with one another or deleted altogether from the process without departing from the spirit and scope of the subject matter described herein.

FIG. 5 illustrates a process 500, which includes an operation 502. Here, a computation service receives a collection of images and a request to create a three-dimensional model of the collection from a client computing device. The request may be explicit, or implicit in the form of the reception of the image collection. As described above, in some instances the images comprise digital photographs of a scene captured by the client computing device or by another device.

At operation 504, the computation service allocates multiple groups of the images to different servers of the computation service. At operation 506, each of these servers converts each image of the group allocated to the respective server to a different-resolution version of the image. The servers may also store these different-resolution versions on one or more predefined storage servers.

Next, at operation 508, each of the servers extracts features from images in the group allocated to the respective server. The servers may then use these extracted features at operation 510 to match images to one another as described above. As illustrated, the operation 510 may comprise multiple sub-operations. First, at sub-operation 510(1), the servers may compare features of the images within the allocated groups. Next, at sub-operation 510(2), the servers may compare the extracted features across the allocated groups, possibly identifying the groups with use of equation (1) described above.

At operation 512, the servers may provide results of the matching to a reconstruction server of the computation service. The reconstruction server may comprise one of the servers performing the operations of operations 502-510, or it may comprise a separate server. In either instance, the reconstruction server may create, with use of the matching results, the requested three-dimensional model of the collection of images at operation 514. This may include creating one or more files that represent locations, positions, or relationships of the images of the collection relative to one another.

Some time thereafter, an operation 516 may receive a request from a client computing device to render the three-dimensional model of the image collection. This request may be received at a particular site (e.g., a website) that has access to the converted images and the reconstructed scene in the form of the reconstruction files.

In response, an operation 518 causes the client computing device to render the three-dimensional model of the image collection. For instance, the site described above may retrieve the reconstruction files and the converted images and may serve the converted images as specified by the reconstruction files such that the client computing device renders the three-dimensional model of the collection.

FIG. 6 illustrates a process 600, which includes, at operation 602, a computation service receiving a collection of images and a request to create a three-dimensional model of the collection. At operation 604, the computation service creates the three-dimensional model at least partly in response to the receiving of the images and the request. Next, an operation 606 represents receiving a request to render the three-dimensional model from a client computing device. Again, this request may be received by the computation service, by a specified website, or the like. Finally, an operation 608 represents causing the client computing device to render the three-dimensional model.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, at a cloud-based computation service from a client computing device over a network, a collection of digital photographs and a request from the client computing device over the network to create a three-dimensional model of the collection; and
   at least partly in response to the receiving:
      allocating multiple groups of digital photographs of the collection to multiple different computation servers of the cloud-based computation service;
      converting, by at least one computation server of the multiple different computation servers and at least partly in parallel, first versions of the digital photographs of the group allocated to the at least one computation server, to second versions of the digital photographs, the second versions of the digital photographs having different resolutions than the first versions of the digital photographs;
      extracting, by the at least one computation server of the multiple different computation servers, one or more features from each digital photograph of the group allocated to the at least one computation server;
      matching, by the at least one computation server of the multiple different computation servers, digital photographs to one another based at least in part on the features extracted from the digital photographs;
      providing results of the matching to a reconstruction server accessible via the network from the client computing device of the cloud-based computation service; and
      creating, by the reconstruction server, the three-dimensional model of the collection based at least in part on the second versions of the digital photographs of the collection and the results of the matching.

2. A method as recited in claim 1, further comprising:
   receiving, from the client computing device, a request to render the three-dimensional model of the collection; and
   causing the client computing device to render the three-dimensional model of the collection based at least in part the three-dimensional model created by the reconstruction server.

3. A method as recited in claim 1, wherein the multiple different computation servers perform the extracting at least partly in parallel with one another and perform the matching at least partly in parallel with one another.

4. A method as recited in claim 1, wherein the matching comprises:
   comparing extracted features from digital photographs within each group; and
   comparing extracted features from digital photographs across groups allocated to multiple different computation servers.

5. A method as recited in claim 1, wherein the collection of digital photographs and the request to create the three-dimensional model of the collection are received from a mobile computing device.

6. One or more computer-readable memory devices storing computer-executable instructions that, when executed by one or more processors, cause the one or more processors to perform acts comprising:
   receiving, at a cloud-based computation service and from a client computing device over a network, a collection of images and a request to create a three-dimensional model of the collection; and creating, by the cloud-based computation service and at least partly in response to receiving the request from the client computing device, the three-dimensional model of the collection, wherein the creating of the three-dimensional model of the collection by the cloud-based computation service comprises converting first versions of the images of the collection to second versions of the images, and wherein the second versions of the images have different resolutions than the first versions of the images.

7. One or more computer-readable memory devices as recited in claim 6, wherein the creating of the three-dimensional model of the collection is performed by a single server of the cloud-based computation service.

8. One or more computer-readable memory devices as recited in claim 6, wherein the creating of the three-dimensional model of the collection is performed by multiple different servers of the cloud-based computation service.

9. One or more computer-readable memory devices as recited in claim 6, wherein the collection of images comprises a collection of digital photographs captured by the client computing device.

10. One or more computer-readable memory devices as recited in claim 6, wherein the creating of the three-dimensional model of the collection by the cloud-based computation service comprises:
   extracting at least one feature from each image of the collection;
   comparing at least a portion of the extracted features to one another; and
   identifying positions of the images of the collection relative to one another based at least in part on comparing;
   and wherein the cloud-based computation service creates the three-dimensional model of the collection based at least in part on the identified positions of the images.

11. One or more computer-readable memory devices as recited in claim 6, wherein the creating of the three-dimensional model of the collection by the cloud-based computation service comprises:
   creating one or more files indicating positions of the images of the collection relative to one another; and
   storing the one or more files on a particular server of the cloud-based computation service;
   and wherein the acts further comprise:
      receiving a request to render the three-dimensional model of the collection from the client computing device; and
      at least partly in response, retrieving the one or more files on the particular server and causing the client computing device to render the three-dimensional model of the collection with use of the one or more files.

12. One or more computer-readable memory devices as recited in claim 6, wherein the cloud-based computation service comprises an image scheduler, a number, N, of computation servers, and a reconstruction server, and wherein the creating of the three-dimensional model of the collection by the cloud-based computation service comprises:
   allocating, by the image scheduler, N groups of images of the collection to the N computation servers;
   extracting, by each of the N computation servers, at least one feature from each image of the respective group allocated to the respective computation server;
   matching, by the N computation servers, the images of the collection based at least in part on the extracting; and
   providing, by at least one of the N computation servers, results of the matching to the reconstruction server;
   and wherein the reconstruction server creates the three-dimensional model of the collection based at least in part on the results of the matching.

13. One or more computer-readable memory devices as recited in claim 12, wherein the cloud-based computation service further comprises a storage server, and wherein the creating of the three-dimensional model of the collection by the computation service further comprises:
   converting, by each of the N computation servers, each image of the respective group allocated to the respective server to a different-resolution version of the respective image; and
   storing each of the different-resolution versions in the storage server.

14. One or more computer-readable memory devices as recited in claim 12, wherein the matching by the N computation servers comprises comparing features of images within the N groups and comparing features of images across the N groups.

15. A system comprising:
   a memory;
   one or more processors coupled to the memory; and
   one or more modules stored on the memory and executable by the one or more processors to:
   receive a collection of images, define multiple groups of images from the collection, and distribute the multiple groups to respectively different servers;
   convert first versions of the images of the collection of images to second versions of the images, the second versions of the images having different resolutions than the first versions of the images, and perform the converting of the images at least partly in parallel;
   extract features from the images of the multiple groups; and
   compare the extracted features to identify positions of the images of the multiple groups relative to one another;
   and wherein the system is accessible to a client computing device over a network.

16. The system as recited in claim 15, wherein the respectively different servers comprise an equal number of servers as a number of the multiple groups of images, each of the equal number of servers is allocated one of the multiple groups of images, and the equal number of servers is configured to:
   extract features from images in parallel with other servers of the equal number of servers; and
   compare features from images in parallel with the other servers of the equal number of servers.

17. The system as recited in claim 15, wherein at least one module of the one or more modules stored on the memory and executable by the one or more processors creates a three-dimensional model of the collection based at least in part on the identified positions of the images of the multiple groups relative to one another.

18. The system as recited in claim 17, wherein:
   at least one other module of the one or more modules stored on the memory and executable by the one or more processors receives the collection of images from the client computing device and over the network prior to the creating of the three-dimensional model of the collection; and
   the system is configured to provide the three-dimensional model of the collection to the client computing device and over the network after the creating of the three-dimensional model of the collection.

* * * * *